UNITED STATES PATENT OFFICE.

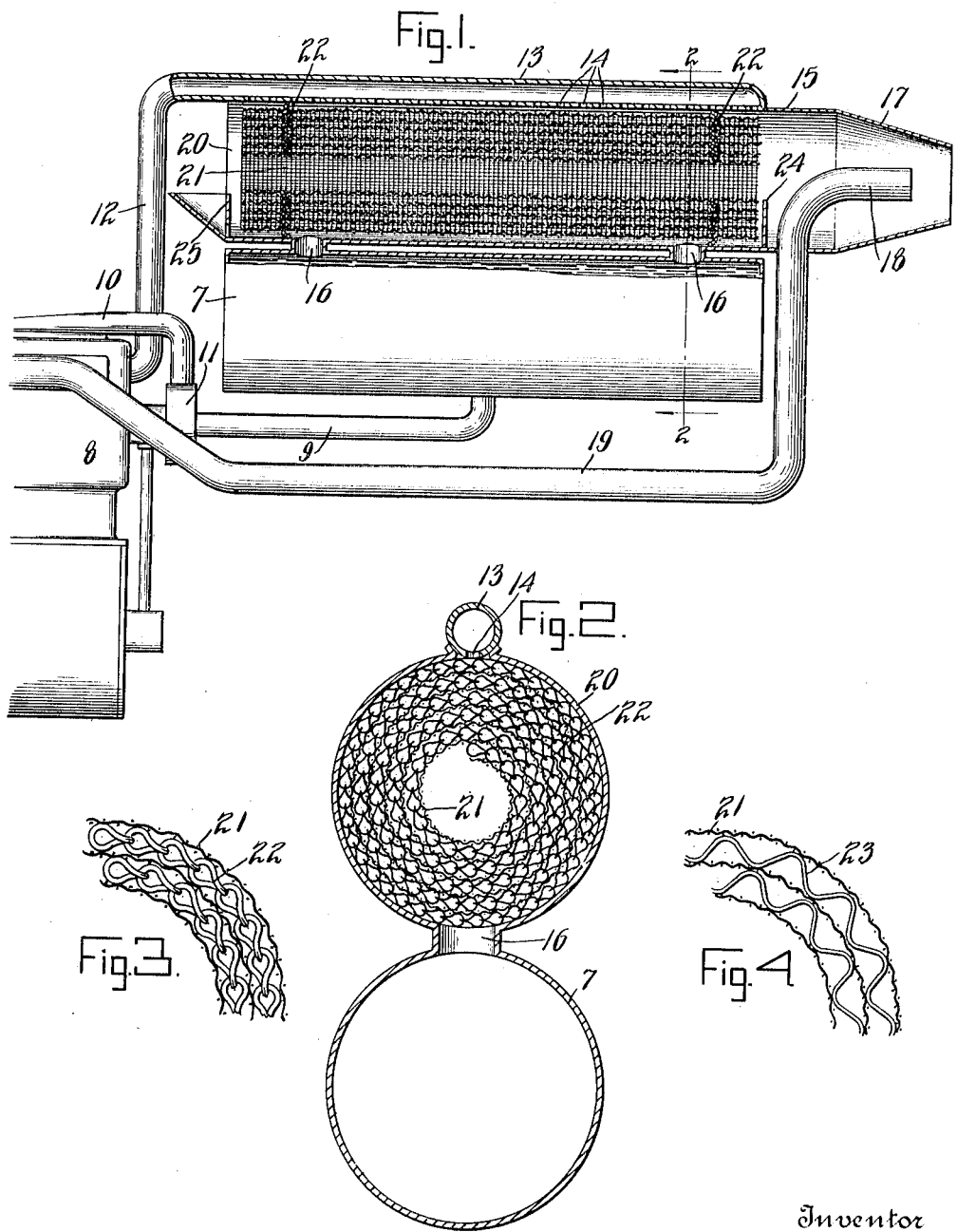

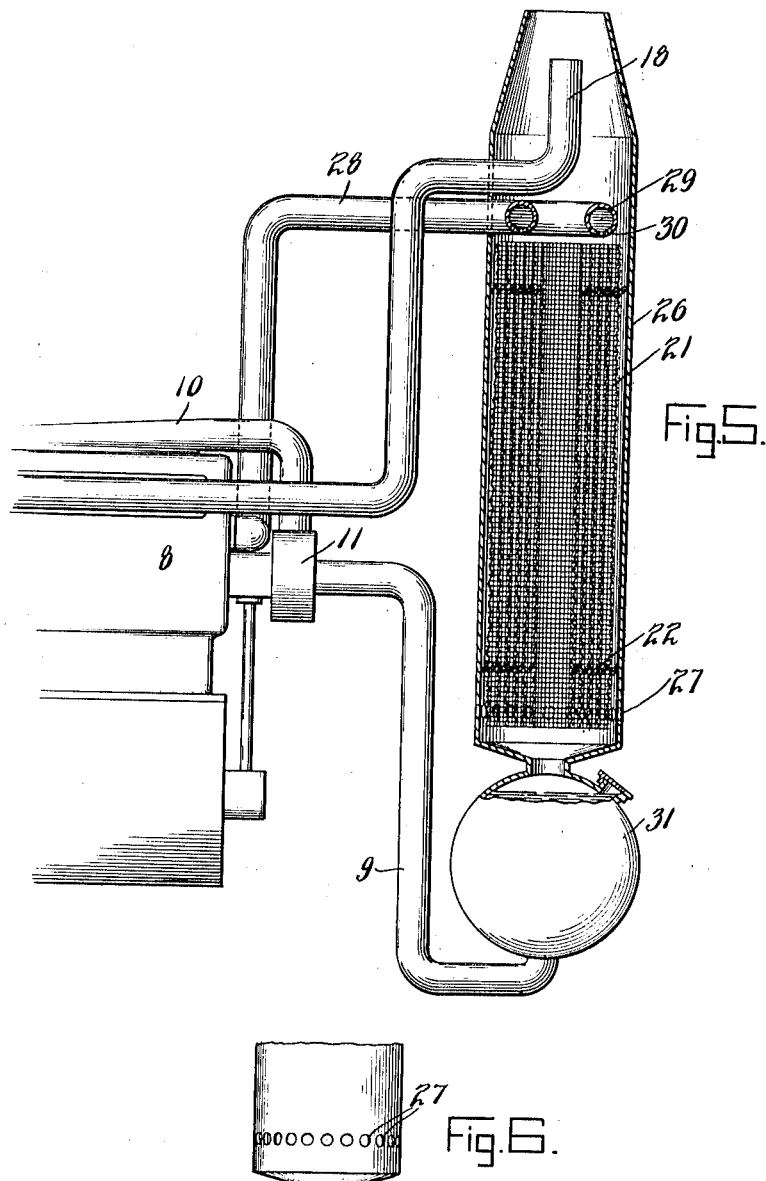
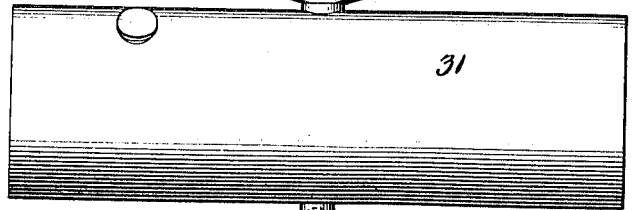

CHARLES T. WILLSON, OF MILLERTON, NEW YORK.

WATER-COOLING APPARATUS.

1,273,436.         Specification of Letters Patent.         Patented July 23, 1918.

Application filed September 1, 1917. Serial No. 189,365.

*To all whom it may concern:*

Be it known that I, CHARLES T. WILLSON, a citizen of the United States, residing at Millerton, Dutchess county, and State of New York, have invented and discovered certain new and useful Improvements in Water-Cooling Apparatus, of which the following is a specification.

My said invention relates to apparatus for cooling the water-circulating system of internal combustion engines and consists in the arrangements and combinations of elements hereinafter described and particularly set forth in the accompanying claims.

The invention has for its purpose to provide a means for dissipating waste heat evolved from the combustion of the explosive charges, and to maintain the circulating water at a constantly low temperature.

A further object of the invention resides in designing an apparatus that may be constructed substantially in its entirety from materials readily obtainable in the open market, and which when assembled may be easily applied to engines without requiring any alteration in their structures.

The invention is disclosed by way of illustration in the accompanying drawings wherein:

Figure 1 is a side elevational view thereof partly in section.

Fig. 2 is a transverse sectional view taken on the line 2—2 of Fig. 1.

Fig. 3 an enlarged fragmentary view of the condensing coil.

Fig. 4 a similar view of a modified construction of coil.

Fig. 5 an elevational view, partly in section, of a modified type of apparatus, and Fig. 6 an elevational view thereof taken at right angles to Fig. 5.

Referring to the construction in further detail and wherein like reference characters designate corresponding parts, the apparatus consists of a water receiving vessel or tank 7 that communicates with the water cooling system of the engine 8 through the pipes 9 and 10, having a suitable pump 11 at their juncture as shown.

The heated water comes from the engine cylinder jacket through the pipe 12 having a horizontal length 13 provided with a plurality of alined apertures 14 for discharging the heated water, and vapors therefrom, into a cooler that is interposed between said discharge and the receiving vessel 7.

The water cooler *per se*, consists of an open ended cylinder 15 attached along its upper surface to the discharge pipe 13 and connected to communicate with the tank 7 through the openings 16 located adjacent either end of said tank. The cylinder 15 is constructed of relatively thin sheet metal and has a reduced and opened end portion 17 that receives the discharging end 18 of the engine exhaust pipe 19 whereby to produce a current of air through the cylinder, from the open end 20, by utilizing the suction of the exhaust as will be understood. In this connection, it may be stated that the air current referred to might also be produced by a blower or other suitable device as preferred.

A sheet of screen 21 is coiled into the form of a cylinder and closely fitted within the cylinder 20, as shown in Figs. 1—2, and the convolutions of said coil are held in respective and equally spaced relation by means of flexible spacing members, preferably by the chains 22, of which there is one located adjacent each end of the screen-cylinder as shown.

In lieu of using a sheet of screen, as herein disclosed, a perforated and sufficiently flexible sheet may be employed; and instead of employing a pair of chains 22 as the spacing means, a pair of corrugated strips 23 (see Fig. 4) may be used. In both instances, however, *i. e.*, whether a perforated sheet or screen be employed, the same is wrapped or rolled, with the spacing elements therebetween and the latter then placed as a unit in the cylinder as shown.

In operation, the heated water or vapors issuing from the openings 14 of the discharge pipe 13 percolate or trickle through the interstices of the screen by which they are cooled by contact with the large metal area thus provided in the small space. Any accumulation of water in the bottom of the cylinder is temporarily provided for by the pair of partitions or plates 24—25 located immediately adjacent the respective ends of the screen cylinder, and extending upward for approximately one third of the height of the cylinder 15. The water as it is cooled, or the accumulated volume in the cylinder 15, enters the receiving vessel 7 whence it is transferred to the motor after the manner stated.

In the construction shown in the Figs. 5—6, the condenser cylinder 26 is disposed vertically as distinct from horizontally and the condenser coil 21 is constructed and mounted therein substantially after the manner disclosed in the former construction.

The exhaust pipe 18 causes a draft or current of air through the cylinder, and said air is admitted by the plurality of apertures 27 formed in the lower end of the cylinder as shown. The pipe 28 from the cooling system enters a coil 29 having discharging apertures 30 for distributing water in fine sprays into the upper end of the cylinder screen whence it travels in the form of thin films on the entire surface of the screen coil 21 and is delivered into the receiving vessel 31 and then to the cylinder water jacket through the pipes 9—10 as in the former instance.

It is obvious that those skilled in the art may vary the details of construction and arrangement of parts without departing from the spirit of my invention, and therefore I do not wish to be limited to such features except as may be required by the claims.

Having thus described my invention what I claim as new and desire to secure by Letters Patent is:

1. In a water cooling apparatus, the combination of a water receiving vessel, means for discharging the water to be cooled, and a cooler interposed between said discharge and the vessel comprising a coiled screen, and spacing means interposed between the convolutions of the screen providing air passage-ways, substantially as set forth.

2. In a water cooling apparatus, the combination of a water receiving vessel, means for discharging the water to be cooled, and a cooler interposed between said discharge and the vessel comprising a coiled screen, and flexible spacing members interposed between the convolutions of the screen providing air passage-ways, substantially as set forth.

3. In a water cooling apparatus, the combination of a water receiving vessel, means for discharging the water to be cooled, and a cooler interposed between said discharge and the vessel comprising a coiled screen, and chains interposed between and spacing the convolutions of the screen providing air passage-ways, substantially as set forth.

4. In a water cooling apparatus for internal combustion engines, the combination of a water receiving vessel, means for discharging the heated water from the cooling system, and a cylinder interposed between said discharge and the receiving vessel, said cylinder adapted to have an air draft created therethrough by the exhaust gases from the engine, a screen coiled and closely fitting in said cylinder, and chains interposed between and spacing the convolutions of the screen providing air passage-ways, substantially as set forth.

5. In a water cooling apparatus for internal combustion engines, the combination of a water receiving vessel, a pipe having perforations for discharging the heated water from the cooling system, a horizontally and open ended cylinder located between said discharge pipe and the receiving vessel, said cylinder adapted to have an air draft created therethrough by the exhaust gases from the engine, a sheet of screen formed into a cylindrical coil and located in said cylinder, and chains interposed between and spacing the convolutions of the screen coil providing air passage-ways, substantially as set forth.

6. In a water cooling apparatus for internal combustion engines, the combination of a water receiving vessel, means for discharging heated water from the engine cooling system, an open ended cylinder located between said discharge and the receiving vessel, partition plates in said cylinder providing a water receptacle, a screen sheet formed into a coil and located in said cylinder between said partition plates, and chains interposed between and spacing the convolutions on the screen to provide air passage-ways, substantially as set forth.

In witness whereof I have hereunto set my hand and seal at Millerton, New York, this 27th day of August, A. D. nineteen hundred and seventeen.

CHARLES T. WILLSON. [L. S.]

Witnesses:
  MYRTLE S. CONKLIN,
  FREDERICK L. CONKLIN.